Aug. 9, 1932.  W. H. HUDSON  1,871,178
TEMPLATE
Filed Sept. 8, 1930
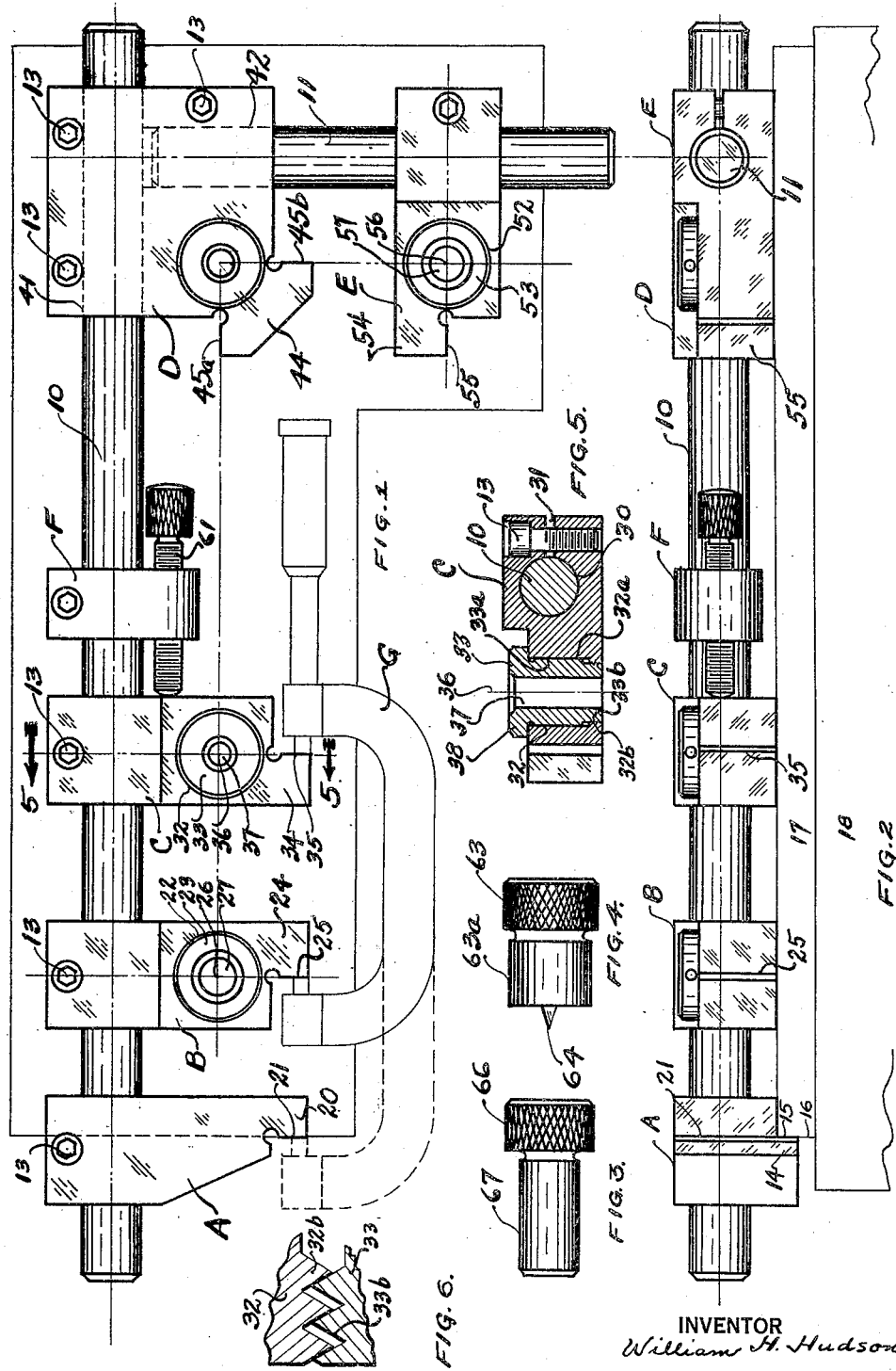
INVENTOR
William H. Hudson
BY Francis D. Hardesty
ATTORNEY Patented Aug. 9, 1932

1,871,178

UNITED STATES PATENT OFFICE

WILLIAM H. HUDSON, OF DETROIT, MICHIGAN

TEMPLATE

Application filed September 8, 1930. Serial No. 480,516.

This invention relates to adjustable templates and more particularly to templates for use in manufacturing die, fixtures, jigs and the like, as contrasted with templates, fixtures, jigs and the like used in quantity production work.

An object of this invention is to provide an adjustable template having a plurality of setting blocks thereon, one of the blocks being provided with an element adapted to engage a datum surface on the work piece, and each of the blocks being provided with an accurately positioned and formed locating surface, adapted to form a base for one portion of a micrometer caliper.

A further object is to provide an adjustable template having means permitting the accurate spacing and forming of drilled holes, points or marks with respect to a datum portion of the work piece, and/or with each other.

A still further object is a novel form of setting block, one which is provided with a bore and a bushing or locating element therein, the bore and bushing having cooperating smooth walls and threaded portions axially disposed with respect to the smooth walls; the cooperating threads being of a size and shape which will prevent any and all movement of the bushing in the block but which will not affect the coaxial relation of the bushing and the block, this feature being advantageous in devices of this character where extremely accurate work is necessary.

Still other objects will readily occur to those skilled in the art upon reference to the following description and the accompanying drawing in which Fig. 1 is a plan view of a template in use.

Fig. 2 is an elevation thereof looking upwardly towards Fig. 1.

Figs. 3 and 4 show parts for use with a setting block.

Fig. 5 is a section on the line 5—5 of Fig. 1.

Fig. 6 is a magnified sectional view of cooperating threads.

As indicated in the drawing, the adjustable template includes a pair of angularly disposed, accurately formed rods 10 and 11, upon which are slidably mounted the various setting or locating blocks forming part of the invention, any one or a number of these blocks being useful with the rods to form a complete template. The various blocks will now be described in detail.

Block A shown at the left of Fig. 1 is bored (not shown) so that it can slide upon the rod 10, there being a clamping bolt 13 threaded into the split portion (not shown) of the block to securely hold it in place. Projecting downwardly from the block is a locating portion or element 14 provided with an accurately formed locating surface 15 on the right side thereof adapted to engage a datum surface 16 of the work piece 17, shown in Fig. 2 as disposed upon the bed plate 18, surface 15 being perpendicular to the axis of the rod 10. Block A is also provided with a forwardly projecting portion 20 having a surface 21 accurately formed so as to be exactly coplanar with the surface 15.

Block B, next in line, is also bored to receive the rod 10 and is also provided with a clamping bolt 13. This block is further bored as at 22 to receive a locating element or bushing 23, and is further provided with a portion 24 having an accurately formed surface 25 exactly perpendicular to the axis of the rod 10 and exactly coplanar with the axis 26 of the bore 22 and of the bore 27 in the bushing 23.

Block C, shown adjacent block B, also bored as at 30 to receive the rod 10 and is also provided with a clamping bolt 13 disposed across the split 31 in the block. Further, block C is bored at 32 to receive the locating element or bushing 33 and also has a projecting portion 34 provided with an accurately formed surface 35 exactly perpendicular to the axis of the rod 10 and exactly coplanar with the axis 36 of the bore 32 and of the bore 37 in the bushing 33, the latter being headed as at 38.

Block D, which is a corner block, is provided with a plurality of right angularly disposed bores 41 and 42, there being a plurality of clamping bolts 13 for securing the block and the rods to one another. Block D is also provided with a projecting portion 44 having surfaces 45a and 45b exactly parallel to the axes of the bores 41 and 42 respectively, and of the rods 10 and 11, respectively, and coplanar with the axes 26 and 56 respectively.

Block E is exactly like block C, being bored at 52 to receive the bushing 53 and being provided with a projecting portion 54 having an accurately formed surface 55 exactly perpendicular to the axis of the rod 11 and exactly coplanar with the axis 56 of the bore 52 and of the bore 57 of the bushing 53.

There is also provided, if desired, an adjusting device for any or all of the setting blocks. As shown, the device F is slidably mounted on the rod 10 and is provided with an adjusting screw 61 adapted to abut a block (block C as shown) to move it slightly on its rod.

The various forms of locating elements adapted to be disposed in the blocks B, C, and E will now be described, reference being had particularly to the forms shown in Figs. 4, 5, and 6, they being capable of use with any of the blocks B, C, and E, but being shown in conjunction with the block C.

The bore 32 of block C is provided with a smooth, accurately formed portion 32a and a threaded portion 32b, and the bushing or locating element 33 is also provided with a smooth portion 33a and a threaded portion 33b, the portion 32a being formed to fit, exactly the similarly formed portion 33a. The formation of the threads at 32b and 33b is particularly important as is shown in Fig. 6, the threads 32b while of the same general type and of the same pitch as the threads 33b are accurately formed so as to fit loosely and centrally, so that when the bushing 33 is threaded into the bore 32, the threads will serve only to draw down and securely hold the head 38 of the bushing against the top surface of the block, the coaxial relation of the bore 32 and bushing 33 being maintained by the smooth walls 32a and 33a. The purpose of this formation is to prevent the threads from affecting the coaxial relation of the parts before mentioned.

Another locating element adapted to be disposed with a bore 32 is shown in Fig. 4. This element, denoted by the numeral 63 is provided with a smooth wall 63a adapted to fit the smooth wall 32a, and is also provided with a marking or locating point 64, disposed in the axis of the smooth wall 63a.

For use with a block such as the block C, in a manner to be described below, there is provided a pin 66 having a portion 67 of exactly the same size as a rod 10, so that it can accurately fit the bore 30 in the block C to support the latter thereon.

Further, different bushings may be provided with holes of different diameters to receive different sized drills, as desired.

Various uses of the device will now be described. Assume that it is desired to provide a plurality of apertures in the work piece or jig 17, the location and formation of these apertures to be exactly correlated with respect to the datum surface 16.

First, the various setting blocks on the adjustable template are moved by the tool maker to their predetermined positions, being accurately set by means of a micrometer caliper such as the one disclosed at G.

In setting the template, all of the blocks are set with reference to the surface 21 of block A. For example, block C is set by using surfaces 21 and 35 as bases for the caliper G. Block B is set by using surfaces 25 and 35 as bases for the caliper G. Block D is set by using surfaces 21 and 45b, or 25 and 45b, and block E is set by using surfaces 45a and 55. All of the blocks having been positioned with respect to surface 21 are therefore accurately positioned with respect to the surface 15, which, as described is coplanar with surface 21.

The template is then brought to the piece 17, and clamped thereon, in such a manner that the setting block A is disposed on the work piece or jig 17 with its surface 15 engaging datum surface 16. By virtue of the prior setting of block B, the axis 26 will be accurately positioned and accordingly a suitable center marker or drill may be disposed within the bore 27 of the bushing 23, in a manner to engage and mark or drill into the work piece 17. Similarly a marker or drill may be inserted in the bores 37 and 57 of the bushings 33 and 53 in blocks C and E to mark or drill the work piece 17 at other determined points.

A number of different uses of the device will readily suggest themselves to the experienced tool or die maker. For example, to form a set of micrometrically adjustable calipers, the die maker can use a rod and two setting blocks, each containing a marking, finding or locating element such as the part 63.

To locate a point with respect to a datum surface or to form a line gauge he will use a rod having thereon a block A and a block provided with a part 63. To locate a point with respect to a hole, he can use a rod provided with two blocks, one of which contains a part 63 and the other of which contains a locating pin, of a form not shown. To locate a hole with respect to a point, he can use a rod and two blocks, one of which contains a part 63 and the other of which contains a bushing. To use the device as a snap gauge he can use a rod having thereon a block B and a block C, the surfaces 25 and 35 then being used.

Further, while only two rods have been shown, it is obvious that any number may be used, in which case a complex template having several rods and many blocks is formed.

It will also be seen that the bores of the bushings may receive drills so that holes may be directly formed in a block, and accurately located with respect to a datum surface or point, without preliminary marking.

It will further be observed that a template set, consisting of one or more rods, two or more setting blocks, and various forms of locating elements, may be sold as a unit, or in parts, the elements being interchangeable.

When it is desired to accurately drill a hole at a previously marked point, the parts shown in Figs. 3 and 4 may be used to advantage. A block, such as the block C, may be removed from the rod 10, and the pin 66 (Fig. 3) is inserted in the bore 30, the bolt 13 being threaded down in the usual manner. The element 63 is then placed in the bore 32 with its point 64 disposed within or at the previously marked point. The block is then clamped to the work piece by means not shown, pin 66 serving to prevent the clamping means from deforming the portions of the block on opposite sides of the split 31. Element 63 is then removed from the bore 32 and its place is taken by an appropriate bushing 33, the bore 37 thereof serving to support, in its vertical position, a drill (not shown) whereby an accurately positioned and a truly vertical hole will be formed.

Accordingly, it will be seen that there has been provided an adjustable template for providing accurately positioned and formed holes in a work piece, jig, fixture, or the like.

Now, having described the invention and the preferred embodiment thereof, it is to be understood that the said invention is to be limited, not to the specific details herein set forth and illustrated, but only by the scope of the claims which follow:

Claims:

1. In an adjustable template, a setting block having a bore, a locating surface exactly perpendicular to the axis of said bore and a second bore whose axis is exactly in line with said surface.

2. In an adjustable template, a setting block having a bore, a locating surface exactly perpendicular to the axis of said bore and a second bore whose axis is exactly in line with said surface, and a locating element in said second bore, the latter having accurately formed threads in a fractional portion thereof, the axis of the element being exactly coincidental with the axis of said second bore, the unthreaded portion of the walls of said bore closely and accurately fitting the exterior wall of said element, the latter having a threaded portion adapted to engage the bore threaded portion, said cooperating threads being so formed as to prevent sliding of said bushing in said bore but not so as to affect the relation of the axes of said bore and bushing.

3. In an adjustable template, a rod, a setting block having a bore for receiving said rod, a locating surface exactly perpendicular to the axis of said bore and a second bore whose axis is exactly in line with said surface.

4. In an adjustable template, a rod, a setting block having a bore for receiving said rod, a locating surface exactly perpendicular to the axis of said bore and a second bore whose axis is exactly in line with said surface, and a locating element in said second bore, the latter having accurately formed threads cut in a fractional portion thereof, the axis of the element being exactly coincidental with the axis of said second bore, the unthreaded portion of the walls of said bore closely and accurately fitting the exterior wall of said element, the latter having a threaded portion adapted to engage the bore threaded portion, said cooperating threads being so formed as to prevent sliding of said bushing in said bore but not so as to affect the relation of the axes of said bore and bushing.

5. In an adjustable template, a rod, a plurality of setting blocks each having a bore for receiving said rod, each of said blocks also having a locating surface exactly perpendicular to the axis of said bore and a second bore whose axis is exactly in line with said surface.

6. In an adjustable template, a rod, a plurality of setting blocks each having a bore for receiving said rod, each of said blocks also having a locating surface exactly perpendicular to the axis of said bore and a second bore whose axis is exactly in line with said surface, and a locating element in said second bore, the latter having accurately formed threads cut in a fractional portion thereof, the axis of the element being exactly coincidental with the axis of said second bore, the unthreaded portion of the walls of said bore closely and accurately fitting the exterior wall of said element, the latter having a threaded portion adapted to engage the bore threaded portion, said cooperating threads being so formed as to prevent sliding of said bushing in said bore but not so as to affect the relation of the axes of said bore and bushing.

7. In an adjustable template, a setting block A having a bore, a portion 14 having on its right side a locating surface 15 exactly perpendicular to the axis of said bore, and a second portion 20 having on its left side a locating surface 21 exactly coplanar with the first named surface.

8. In an adjustable template, a setting block A having a bore and portions 14 and 20 projecting therefrom in staggered relation, said portions having mutually coplanar locating surfaces 15 and 21 exactly perpendicular to the axis of said bore.

9. In an adjustable template, a rod, a pair of setting blocks having aligned rod receiving bores, parallel locating surfaces exactly perpendicular to the axis of said bores, and second bores each having its axis exactly coplanar with its respective surfaces, the locating surfaces being disposed on opposite sides of said setting blocks.

10. In an adjustable template, a rod, a pair of setting blocks, each having a rod receiving bore, a locating surface exactly perpendicular to the axis of said bore, and a second bore whose axis is exactly in line with said surface, the surfaces being so disposed with respect to each other as to form locating surfaces for an outside caliper.

11. In an adjustable template, a corner setting block having angularly disposed bores, a locating surface exactly parallel to the axis of one of said bores and a second locating surface exactly parallel to the axis of the other of said bores.

12. In an adjustable template, a corner setting block having angularly disposed bores and locating surfaces exactly parallel respectively to the axes of said bores, a rod accurately fitted in each of said bores, a setting block adjustably mounted on each of said rods, a locating element on each of said setting blocks, each of said setting blocks having a locating surface exactly in line with each of said locating elements and exactly parallel to one of the locating surfaces on the corner block.

13. In an adjustable template, a setting block having an accurately formed bore provided with threads on a fractional portion of the wall thereof, and a locating element provided with a wall exactly fitting the smooth portion of the bore, and threaded on a fractional portion of the wall thereof, the cooperating threads being accurately formed of the same pitch and of the same general type but differing slightly in diameter size so as not to affect the relation of the axes of said locating element and said bore.

WILLIAM H. HUDSON.